2,806,814

Patented Sept. 17, 1957

2,806,814

DENTAL PREPARATIONS

Virgil John Richter, Orange, N. J., assignor to Colgate-Palmolive Company, Jersey City, N. J., a corporation of Delaware No Drawing. Application October 4, 1954, Serial No. 460,276

7 Claims. (Cl. 167—93)

The present invention relates to dental preparations comprising in combination a higher aliphatic acyl amide of an amino carboxylic acid compound and a silicone compound.

According to U. S. Patent No. 2,689,170, it is known that suitable oral preparations containing certain aliphatic amides of amino acids as active ingredients possess unusual properties. Such dentifrices and the like containing the specified active ingredients, e. g. sodium N-lauroyl sarcoside, may be used in the ordinary or conventional manner and nevertheless inhibit the acid-producing effects of the bacteria in saliva upon fermentable carbohydrates for a prolonged period of time. Thus, the active ingredients may be introduced into the oral cavity by brushing the teeth with a dentifrice once or twice a day for example, and the resulting prolonged retention or residual activity of these active ingredients will be sufficient to inhibit the acid production from the fermentable carbohydrates during the day. These active ingredients are characterized further by their unusual property of being adsorbed upon and released from suitable protein material in the presence of saliva, which property in part permits the acid-inhibiting effect for a prolonged period of time.

The silicone compounds represent a special class of chemical materials which has been suggested for a variety of possible applications based upon their known properties of adhesiveness, foam depressing, water- and grease-repellency, physiological inertness and so forth. Accordingly, they have been proposed for the preparation of greases, lubricating oils, resins, rubbers, as medicinal carriers, and in cosmetics such as hand lotions and dentifrices. In the latter type of proposal, it has been postulated that these silicone compounds may prevent the adhesion of or facilitate the removal of tars, stains, tartar and the like from teeth. There does not seem to be a wide understanding of the silicones, however, and therefore further developments and applications are necessarily based to some extent on empirical research and investigation.

According to the present invention, improved dental compositions may be formed by the combination of a higher aliphatic acyl amide of an amino carboxylic acid compound and a silicone compound, as hereinafter described and claimed. It has been found that the silicone compound acts as a synergist in improving the anti-bacterial and acid-inhibiting activity of such active ingredients against the oral flora in a particular manner, even though the silicone compound is inert and possesses no such activity by itself. The addition of the silicone compound seems to prolong and enhance additionally the effects of the active ingredients, in comparison to the results obtained with the use of the active ingredients per se. Furthermore, the amount of active ingredient which is adsorbed upon and released from protein material is increased by the presence of the silicone compound in combination therewith.

Such effects are unique with this specific combination, and not exhibited with the use of other materials such as soap or sulfonated detersive compounds, in place of the specified higher aliphatic amides of amino acids. The latter compounds possess a characteristic adsorptive capacity for protein material, such as mucin and casein, which permits prolonged activity against the oral flora. The synergistic activity of the silicone compound is evident only with such materials, since the silicone enhances the protein adsorption of such amides and consequently maintains them in active form permitting longer anti-bacterial and acid-inhibiting power. In contrast, surface active agents which are not adsorbed upon protein cannot exert any prolonged anti-bacterial effect, and are not enhanced in this respect by admixture with a silicone compound.

In general, the suitable active ingredients are the substantially saturated higher aliphatic acyl amides of lower aliphatic amino carboxylic acid compounds, such as those having about 12 to 16 carbon atoms in a long-chain fatty acyl radical. Optimum results are achieved with the dodecanoyl, tetradecanoyl, hexadecanoyl derivatives, with the preferred amides having the formula:

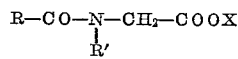

wherein R—CO— is a saturated fatty acyl radical of about 12 to 16 carbon atoms, R' is hydrogen or lower alkyl group and X is hydrogen or a cation which forms water-soluble salts. In usual practice, the N-lauroyl, myristoyl and palmitoyl sarcosides are used however.

These compounds may be produced by the condensation of a higher fatty acylating substance with the suitable amino compound. The amino acid portion of these active ingredients is generally derived from the lower aliphatic saturated mono-aminocarboxylic acids, such as those having about 2 to 6 carbons, usually the monocarboxylic acid derivatives. It is preferred that the compounds be derived from the amino substituted lower alkane carboxylic acids, particularly the alpha amino substituted acids. Suitable amino acids from which the higher fatty amides thereof may be derived are aminoethanoic acid (glycine), methylaminoethanoic acid (sarcosine), 2-aminopropanoic acid (alanine), 3-aminopropanoic acid, and valine. It is preferred to use the amides of those acids having about 2 to about 5 carbon atoms, and particularly, the sarcoside derivatives and homologues having up to about 5 carbon atoms in the amino acid portion of the molecule in view of the excellent results obtained by their use.

Such amides of amino carboxylic acid compounds are to be generally employed in the form of their free acids or preferably as the water-soluble salts thereof. In general, the desired salts are the water-soluble carboxylate salts such as the alkali metal (e. g. sodium, potassium), ammonium, amine and alkylolamine (e. g. mono-, di-, triethanolamine). Further specific examples are sodium N-lauroyl sarcoside, potassium N-lauroyl sarcoside, sodium N-myristoyl sarcoside, sodium N-palmitoyl sarcoside, ethanolamine N-lauroyl sarcoside, N-lauroyl sarcosine, sodium N-lauroyl alanine, and sodium N-lauroyl glycide. The alkali metal salt derivatives appear to be about equally effective and yield usually optimum results in comparison to other water-soluble salts. For convenience herein, reference to "amino carboxylic acid compound," "sarcoside," "glycide," etc., refers to such compounds having a free carboxylic group or the water-soluble carboxylate salts.

These amides are utilized generally in pure or substantially pure form. They should be substantially free from soap or similar higher fatty acid material which is formed in normal commercial methods of manufacture and which tends to neutralize or substantially reduce the special characteristics which are exhibited by these amide compounds. In usual practice, the amount of higher fatty acid material should be less than 15% by weight of the amide compound and insufficient to substantially adversely affect said amide, and preferably less than about 10% of said amide compound.

The silicone compounds used in the present invention are the polymers having as the framework the siloxane unit, —Si—O—Si—, with one or two organic groups attached to each silicon atom, and referred to herein as organo-polysiloxanes. The silicone fluids which have usually a viscosity of about one to one millon centistokes at about 25° C. are particularly suitable, such materials having usually at least one aliphatic group, such as methyl or ethyl, preferably the methyl type, attached to each silicon atom. The methyl silicone fluids (or dimethyl polysiloxanes) have the nucleus

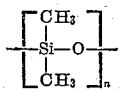

where $n$ varies over a wide range. The larger the $n$, (or molecular weight) the higher is the viscosity which varies from about one to one million centistokes at 25° C., preferably up to about 100,000 cs., and particularly from about 10 to 1000 cs., and is used to identify the same. The dimethyl polysiloxanes having the structure

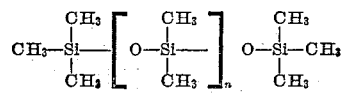

where $n$ is from about 23 to 211 have been found to be particularly effective in the present invention, though $n$ may be lower or higher, such as from about 1 and preferably from about 14 up to about 2000 for example.

Examples of suitable dimethyl polysiloxanes are those known as the Dow Corning 200 fluids having viscosities of about 10, 20, 50, 100, 200, 350, 500 and 1000 centistokes at 25° C., and the General Electric SF–96 series having viscosities of about 40, 100, 300, 500 and 1000 centistokes. The General Electric 81220 series of dimethyl polysiloxanes having viscosities from 1000 to 100,000 centistokes may be used also.

A further type of silicon fluid is the organo-polysiloxanes which have both an aromatic group such as phenyl, tolyl or benzyl, and an aliphatic group such as methyl attached to the silicon atoms. An example is the methyl-phenyl polysiloxanes which are co-polymers having similar viscosities, preferably having about 10 to 1000 centistokes. A suitable material is General Electric 81431 which is an ethyl alcohol soluble silicone fluid having a viscosity of about 35–60 centistokes at 100° F. and is a co-polymer of a methyl siloxane and a phenyl siloxane having 80 mole percent methyl and 20 mole percent phenyl in the product.

The amide compound and silicon polymer exert their beneficial effects in variable proportion depending upon the specific type of composition and ingredients. The relative proportions are significant however in order to obtain optimum effects. In general, they will each be a minor amount of the composition, such as at least about 0.05%, and preferably from about 0.1 to about 10% of amide compound and from about 0.1 to about 2% of the silicone polymer by weight of the composition. In the case of dentifrices such as dental creams, it is usual to use an amount from about 0.5 to 5% by weight of the amide, and from about 0.1 to about 2% by weight of the silicone polymer. If the polymer is used in significantly greater amounts, it exerts a marked foam-depressant action, and it is preferred therefore to use the silicon polymer in amounts insufficient to substantially adversely affect the foaming power during use.

This combination of ingredients may be utilized in any preparations designed for application to the oral cavity which are referred to herein as dental preparations. Such dental preparations include suitable toothpastes and dental creams, tooth powders, liquid dentifrices, mouth washes or rinses, lozenges, tablets, chewing gum, dental floss and the like. These preparations may contain various adjuvant materials in suitable amounts provided the same do not substantially adversely affect the desired results.

Any suitable practically water-insoluble polishing agent may be admixed with these novel compounds in the preparation of the dentifrice compositions such as tooth powders, pastes, creams, and the like. There is a relatively large number of such materials known in the art. Representative materials include, for example, dicalcium phosphate, tricalcium phosphate, insoluble sodium metaphosphate, aluminum hydroxide, magnesium carbonate, calcium sulfate and bentonite, including suitable mixtures thereof. It is preferred to use the water-insoluble calcium or magnesium salts as the polishing agents and, more particularly, calcium carbonate and/or a calcium phosphate, such as dicalcium phosphate dihydrate. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be in greater proportion, such as about 70–95%.

In the preparation of tooth powders, it is usually sufficient to mechanically admix the various solid ingredients with the silicone fluid so as to absorb it thereon.

In dental cream formulations, the liquids and solids should necessarily be proportioned to form a creamy mass of desired consistency which is extrudible from a collapsible aluminum or lead tube. In general, the liquids in the dental cream will comprise chiefly water, glycerine, sorbitol, propylene glycol, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e. g. Irish moss, gum tragacanth, sodium carboxymethylcellulose, polyvinylpyrrolidone, starch and the like, usually in an amount up to about 10%, and preferably about 0.5–5% of the formulation.

Mouth washes or rinses are also within the scope of the present invention. Such products are usually an effective amount of the active ingredient and silicone polymer dissolved, dispersed or otherwise incorporated in a suitably flavored liquid vehicle, preferably aqueous alcoholic vehicle. Any suitable amount may be used, such as up to 5% by weight of active ingredient and polymer. The alcohol concentration may vary depending on the mouth effect desired, such as about 5–70% alcohol, and preferably 5–40% by weight. Liquid dentifrices are also included, such products usually contaning a minor amount of active ingredient, usually dissolved or dispersed in an aqueous alcoholic vehicle, and preferably containing a mucilaginous material and optionally combined with small amounts of polishing agent, alcohol, glycerine, coloring and flavoring materials.

Various adjuvant materials may be incorporated in such dental preparations. Added materials in the formulation which do not substantially adversely affect the properties and characteristics may be suitably selected and used in proper amount depending upon the particular type of preparation. Such materials may be used as soluble saccharin, flavoring oils (e. g., oils of spearmint, peppermint, wintergreen), coloring or whitening agents (e. g., titanium dioxide), preservatives (e. g., sodium benzoate), emulsifying agents, alcohol, menthol and the like. Other suitable materials are chlorophyllin and various ammoniated ingredients, such as urea, diammonium phosphate and mixtures thereof.

In the case of chewing gum and other products, the active ingredients and polymer may be incorporated in any suitable manner during the usual manufacture of the product. For example, they may be incorporated in a warm gum base with stirring to distribute the same uniformly therein. They may be added also to the exterior or outer surfaces of a gum base in order to coat the base. The usual gum bases may be used, representative materials being jelutong, chicle, rubber latex and vinylite resins, in addition to other usual materials such as plasticizers or softeners, sugar or other suitable carbohydrates such as glucose and sorbitol.

Other indicated types of compositions will be formulated in known manner also.

This combination is suitable also for use as an improved anti-bacterial agent in food compositions, particularly such foods which comprise a fermentable carbohydrate and which are susceptible to degradation with the production of acid by microorganisms normally found in the oral cavity. Such active ingredients may function thereby as a preservative against bacterial growth and as an inhibitor of acid formation from the fermentable carbohydrate food, preferably such foods containing a refined sweet fermentable sugar content (e. g., sucrose, dextrose, corn syrup, and the like). Among the food products are suitable milk or dairy products (e. g. ice cream), bakery products (e. g., sweet baked goods such as cake), confectionery or candy (e. g., fudge), beverages such as the popular carbonated beverages, fruit products, and the like. The amount of active ingredient and silicone will be a minor amount of the composition, such as up to about 5% and preferably up to about 1% each by weight of the food composition.

The following specific examples are further illustrative of the nature of the present invention, but it is to be understood that the invention is not limited thereto. The compositions are prepared in the usual manner as indicated, and all amounts of the various ingredients are by weight unless otherwise specified.

*Example I.—Dental cream*

| | Percent |
|---|---|
| Sodium N-lauroyl sarcoside | 2 |
| Methyl silicone fluid | 1 |
| Calcium carbonate | 5 |
| Dicalcium phosphate dihydrate | 45 |
| Glycerine | 30 |
| Water | 14 | the balance consisting essentially of soluble saccharin, flavor, preservatives and stabilizing agents. The silicone fluid above is an alcohol-insoluble dimethyl siloxane polymer having a viscosity of 350 centistokes. The formulation after use exerts excellent inhibition of acid production in the mouth for an unusually prolonged period of time, the addition of the silicone to the sarcoside apparently increasing the effectiveness of the cream.

The following silicone fluids in the indicated amounts have been substituted in the above formula and produce highly satisfactory compositions also:

| Silicone fluid | Amount, Percent | Viscosity, cs. |
|---|---|---|
| Methyl | .1 | 350 |
| Do | .25 | 350 |
| Do | .5 | 350 |
| Do | .5 | 50 |
| Do | .5 | 20 |

*Example II.—Dental cream*

In the above formula in Example I, there was substituted as the silicone fluid an equivalent amount of an alcohol-miscible silicone fluid having a viscosity of about 35–60 centistokes. This polysiloxane is a co-polymer of the methyl siloxane and phenyl siloxane types having 80 mole percent methyl and 20 mole percent phenyl in the product.

This formula exhibits a superior acid-inhibiting power and anti-bacterial effect on the oral flora after adsorption on protein material, in comparison to the same formula without the silicone polymer.

*Example III.—Tooth powder*

| | Percent |
|---|---|
| Sodium N-lauroyl sarcoside | 4 |
| Disodium acid pyrophosphate | 2 |
| Methyl silicone fluid (350 cs.) | 1 |
| Saccharin | 0.1 |
| Flavor | 2.5 |
| Dicalcium phosphate dihydrate | Balance |

*Example IV.—Mouthwash*

| | |
|---|---|
| Sodium N-lauroyl sarcoside | 0.1 |
| Methyl-phenyl silicone fluid (35–60 cs.) | 0.1 |
| Ethyl alcohol | 20.0 |
| Flavor | 0.1 |
| Saccharin | 0.1 |
| Water | Balance |

*Example V.—Liquid dentifrice*

| | |
|---|---|
| Potassium lauroyl saccoside | 6 |
| Methyl-phenyl silicone fluid (35–60 cs.) | 0.2 |
| Ethyl alcohol | 10.0 |
| Flavor | 2.5 |
| Saccharin | 0.3 |
| Water | Balance |

*Example VI.—Chewing gum*

| | |
|---|---|
| Sodium lauroyl sarcoside | 0.5 |
| Methyl silicone fluid (1000 cs.) | 0.5 |
| Gum base, e. g. chicle | 20.0 |
| Sucrose | 60.0 |
| Corn syrup | 18.5 |
| Flavor | Balance |

Although the present invention has been described with reference to particular embodiments and examples, it will be apparent to those skilled in the art that variations and modifications of this invention can be made and equivalents can be substituted therefor without departing from the principles and true spirit of the invention.

Having thus described the invention what is claimed is:

1. A dental preparation comprising a mixture of a substantially saturated aliphatic acyl amide of a saturated aliphatic monoaminocarboxylic acid compound having 2 to 6 carbon atoms, the aliphatic acyl group having about 12 to 16 carbon atoms, and less than about 15% by weight based on said amide of higher fatty acid material, the amount of said material being insufficient to substantially adversely affect said amide, and from 0.1% to about 2% by weight of an organo-polysiloxane.

2. A dental preparation in accordance with claim 1 wherein said organo-polysiloxane is a dimethyl polysiloxane.

3. A dental preparation in accordance with claim 1 wherein said polysiloxane is a methyl-phenyl silicone fluid.

4. A dental preparation in accordance with claim 1 wherein said polysiloxane has a viscosity from about 10 to 1000 centistokes.

5. A dental preparation in the form of a dentifrice comprising a polishing material, a substantially saturated N-fatty acyl sarcoside compound having 12 to 16 carbon atoms in said acyl group and having less than about 10% of higher fatty acid material based on the weight of said sarcoside, and from 0.1% to about 2% by weight of an organo-polysiloxane.

6. A dental cream comprising a polishing material, sodium N-lauroyl sarcoside having less than 10% of a higher fatty acid material based on the weight of said sarcoside and from 0.1% to about 2% by weight of a dimethyl polysiloxane having a viscosity from about 10 to 1000 centistokes.

7. A dental cream comprising a polishing material, sodium N-lauroyl sarcoside having less than 10% of higher fatty acid material based on the weight of said sarcoside and from 0.1% to about 2% by weight of a methylphenyl polysiloxane having a viscosity from about 10 to 1000 centistokes.

References Cited in the file of this patent

UNITED STATES PATENTS

| 2,689,170 | King | Sept. 14, 1954 |

FOREIGN PATENTS

| 686,429 | Great Britain | Jan. 21, 1953 |
| 689,679 | Great Britain | Apr. 1, 1953 |